United States Patent [19]
Li et al.

[11] Patent Number: 5,389,333
[45] Date of Patent: Feb. 14, 1995

[54] HYDROGEN STORAGE ALLOYS

[75] Inventors: Yufeng Li; Deming Xu; Mingming Geng; Jun Li; Siqing Xu, all of Beijing, China

[73] Assignee: Central Iron & Steel Research Institute of Ministry of Metallurgical Industry, Beijing, China

[21] Appl. No.: 114,876

[22] Filed: Aug. 31, 1993

[51] Int. Cl.$^6$ .................. H01M 4/00; C22C 19/00
[52] U.S. Cl. ........................ 420/455; 420/900
[58] Field of Search .................. 420/900, 455

[56] References Cited

U.S. PATENT DOCUMENTS

| | | | |
|---|---|---|---|
| 4,400,348 | 8/1983 | Osumi et al. | 420/443 |
| 4,744,946 | 5/1988 | Sasai et al. | 420/443 |
| 5,008,164 | 4/1991 | Furukawa et al. | 420/455 |
| 5,085,944 | 2/1992 | Ebato et al. | 420/900 |
| 5,284,619 | 2/1994 | Hazama | 420/900 |

FOREIGN PATENT DOCUMENTS 0342654 11/1989 European Pat. Off.
0383991 8/1990 European Pat. Off.

*Primary Examiner*—Upendra Roy
*Attorney, Agent, or Firm*—Ladas & Parry

[57] ABSTRACT

The present invention discloses a hydrogen storage alloy having a formula of

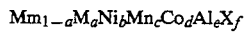

$$Mm_{1-a}M_aNi_bMn_cCo_dAl_eX_f$$

wherein, Mm is misch metal mainly containing La, Ce, Pr, Nd and the balance amount of unavoidable impurities; M is titanium, zirconium or the mixture thereof; X is nitrogen, boron or the mixture thereof; and a is in the range of 0.01–0.2; b is in the range of 3.50–4.60; c is in the range of 0.20–0.60; d is in the range of 0.10–0.7; e is in the range of 0.1–0.5; f is in the range of 0.005–0.2; and b+c+d+e+f is in the range of 4.8–5.4.

6 Claims, No Drawings

HYDROGEN STORAGE ALLOYS

FIELD OF THE INVENTION

The present invention relates to a hydrogen storage alloy, particularly to a nickel-hydride active material used as negative electrode of rechargeable batteries, more particularly to a misch metal series hydrogen storage alloy used as negative electrodes.

BACKGROUND OF THE INVENTION

Nickel-Metal hydrides negative electrode active materials used as negative electrodes materials of rechargeable batteries can be classified into two kinds of hydrogen storage alloys, one is Ni—Zr—Ti series developed from $Ti_2Ni$ and TiNi, another is misch metal series developed from $LaNi_5$. Hydrogen storage alloys used as negative electrode materials of rechargeable batteries should meet the following requirements: good anti-alkaline-corrosion properties; high hydrogen storage capacity, appropriate hydrogen equilibrium pressure (generally should be less than 0.5 MPa); high electrically catalytic activity; low pulverization ratio during hydrogen absorption and desorption process; no pollution on environments, and low cost etc. Ni—Zr—Ti series alloy has good comprehensive properties, and misch metal series alloy is a relatively lower cost hydrogen storage alloy used as negative electrode material. Japanese Patent Application No. 16614/1988 (Sep. 7, 1988) and European Patent Application No. 0206776 (1986) disclose two misch metal series hydrogen storage alloys used as negative electrode material of rechargeable batteries, and they have the characteristics of good negative electrode activity and low cost. However, these two hydrogen storage alloys are easy to be pulverized after hydrogen absorption and desorption, the crystal cell volume expansion ratio is as high as 20 percent. In addition, the rare earth elements used in these two hydrogen storage alloys tend to segregate toward the powder surface during the hydrogen absorption and desorption process due to the internal stress. The rare earth elements segregated at the powder surface will form hydroxides thereof under the action of KOH solution presented in the batteries and cause corrosion, and finally the hydrogen absorption and desorption abilities of the hydrogen storage alloys will be lost, and the cycle lifetime of the hydrogen storage alloys will be greatly decreased.

OBJECTS OF THE INVENTION

One object of the present invention is to overcome the shortcomings of low cycle lifetime of the misch metal series hydrogen storage alloys of the prior art and to provide a misch metal series hydrogen storage alloy having longer cycle lifetime, lower pulverization ratio and good anti-alkaline-corrosion abilities.

Another object of the present invention is to provide a rechargeable battery having a negative electrode made from the hydrogen storage alloy of the present invention.

SUMMARY OF THE INVENTION

The present invention relates to a misch series hydrogen storage alloy used as the negative electrode material of rechargeable batteries, said hydrogen storage alloy having the formula of

wherein,
Mm is a misch metal mainly containing La, Ce, Pr and Nd;
M is titanium, zirconium or the mixture thereof;
X is nitrogen, boron or the mixture thereof; and
a is in the range of 0.01–0.2;
b is in the range of 3.50–4.60;
c is in the range of 0.20–0.60;
d is in the range of 0.10–0.7;
e is in the range of 0.1–0.5;
f is in the range of 0.005–0.2; and
b+c+d+e+f is in the range of 4.8–5.4.

According to the present invention, Mm is preferably a misch metal containing about 40 to about 50 percent by weight of La, about 2.0 to about 4.0 percent by weight of Ce, about 10 to about 15 percent by weight of Pr, about 35 to about 40 percent by weight of Nd and the balance amount of unavoidable impurities. More preferably, Mm is a misch metal containing 43.1 percent by weight of La, 3.3 percent by weight of Ce, 13.5 percent by weight of Pr, 38.9 percent by weight of Nd and the balance amount of unavoidable impurities.

The present invention also provides a rechargeable battery which comprises a negative electrode made from the hydrogen storage alloy of the present invention.

DETAILED DESCRIPTION OF THE PRESENT INVENTION

It has been found that misch metal series hydrogen storage alloys used as negative electrode material is a kind of cheap negative electrode active material of rechargeable batteries, but it has the disadvantage of low cycle lifetime. The low cycle lifetime of misch metal series hydrogen storage alloy is caused by the following two reasons: (1) misch metal series hydrogen storage alloy powders are easy to be pulverized during the hydrogen absorption and desorption process, the obvious sign of which is the high volume expansion ratio $$\frac{V-V_O}{V_O} = \frac{V-V_O}{V_O} \times 100\%,$$

wherein V and Vo is the cell volume of the main phase of the alloy after and before hydrogen absorption respectively; (2) the anti-alkaline-corrosion properties are poor, and after oxidation, the hydrogen storage ability of this series of hydrogen storage alloy will be lost.

After a lot of experiments, the inventors of the present invention have found that the addition of nitrogen and boron into a misch metal series hydrogen storage alloy can greatly increase the cycle lifetime of the hydrogen storage alloy of misch metal series. In such an alloy, nitrogen and boron atoms occupy the interstitial site of the hexagonal phase which causes lattice distortion. The alloys obtained thereby are strengthened, the alloy powders are stabilized and are difficult to be pulverized. In addition, nitrogen and boron atoms combine with the rare earth atoms presented in the alloys and form very stable rare earth metal compounds, which prevents the rare earth elements presented in the alloys, such as Lanthanum, from alkaline-corrosion, and improves the anti-corrosion properties of the alloy. The enhancement of the strength and anti-corrosion properties of the alloys increases the cycle lifetime of the alloys.

The present invention discloses a hydrogen storage alloy used as negative electrode material of rechargeable batteries, said hydrogen storage alloy having the formula of $$Mm_{1-a}M_aNi_bMn_cCo_dAl_eX_f$$

wherein,
Mm is misch metal mainly containing La, Ce, Pr, Nd and unavoidable impurities;
M is titanium, zirconium or the mixture thereof;
X is nitrogen, boron or the mixture thereof; and
a is in the range of 0.01–0.2;
b is in the range of 3.50–4.60;
c is in the range of 0.20–0.60;
d is in the range of 0.10–0.7;
e is in the range of 0.1–0.5;
f is in the range of 0.005–0.2; and
b+c+d+e+f is in the range of 4.8–5.4.

According to the present invention, Mm in the alloy is a misch metal mainly containing La, Ce, Pr, Nd and the balance amount of unavoidable impurities.

Preferably, Mm in the alloy of the present invention is a misch metal containing about 40 to about 50 percent by weight of La, about 2.0 to about 4.0 percent by weight of Ce, about 10 to about 15 percent by weight of Pr, about 35 to about 40 percent by weight of Nd and the balance amount of unavoidable impurities.

More preferably, Mm in the alloy of the present invention is a misch metal containing 43.1 percent by weight of La, 3.3 percent by weight of Ce, 13.5 percent by weight of Pr, 38.9 percent by weight of Nd and the balance amount of unavoidable impurities.

In a misch metal series hydrogen storage alloy, the capacity for storing hydrogen of a hydrogen storage alloy is mainly determined by the rare earth elements presented therein. Among the rare earth elements, La and Nd have relatively high affinity with hydrogen, and they can combine with hydrogen to form hydrides thereof, for example $LaH_2$ etc. In addition, rare earth elements can adjust hydrogen equilibrium pressure to medium level. According to the hydrogen storage alloys of the present invention, the atom ratio of rare earth elements (Mm) is in the range of 0.8–0.99. If the atom ratio of Mm in a hydrogen storage alloy is less than 0.8, the amount of hydrogen absorbed by the alloy will be greatly decreased. If the atom ratio of Mm in a hydrogen storage alloy is higher than 0.99, the activity of the rare earth elements presented in the alloy will be increased due to the mechanical stress produced during process of cyclic hydrogen absorption and desorption, and the rare earth atoms will segregate onto the surface of the alloy and will form their hydroxides which will result in the decrease of hydrogen storage capacity of the hydrogen storage alloy used as negative electrode material.

Ti and Zr have the same effect in a hydrogen storage alloy. Both Ti and Zr are strong hydrogen-absorbing agents. They can combine with hydrogen to form their hydrides, for example, $TiH_2$ and $ZrH_2$. Ti can also enhance the strength of the alloy, Zr can prevent the alloy from pulverization. Both Ti and Zr can decrease hydrogen equilibrium pressure. According to the hydrogen storage alloy of the present invention, the total atom ratio of Ti and Zr is in the range of 0.01–0.2, and they can be added together or separately. If the total atom ratio of Ti and Zr is less than 0.01, there will be no effect on the improvement of strength and anti-pulverization properties of the alloy; and if it is higher than 0.2, the hydrogen equilibrium pressure would be very low, and the effective hydrogen absorption content and the electric capacity of the negative electrode made from the alloy will be decreased.

Mn can enhance the anti-corrosion properties, improve the hydrogen absorption and desorption amount effectively, and increase the activity of a hydrogen storage alloy. In addition, it can decrease the self-discharge capacity of a battery containing a negative electrode made from the said alloy. In the hydrogen storage alloy of the present invention, the atom ratio of Mn is in the range of about 0.2 to about 0.6. If the atom ratio of Mn in an alloy is less than 0.2, the amount of hydrogen absorbed and desorbed by the alloy would be decreased. If the atom ratio of Mn in the alloy is higher than 0.6, Mn++ would precipitate in an alkaline solution which would result in deterioration of the properties of hydrogen absorption and desorption of the alloy.

Al is easy to form dense oxidation films on the surface of an alloy, which can protect the rare earth atoms, such as La and Nd segregated on the surface of the alloy from oxidation. Al can also decrease the self-discharge capacity of a battery containing a negative electrode made from the said alloy and adjust hydrogen equilibrium pressure. In the hydrogen storage alloy of the present invention, the atom ratio of Al is in the range of about 0.1 to about 0.5. If it is less than 0.1, the amount of hydrogen absorbed and desorbed by the alloy would decrease, that is to say, the electric capacity of the negative electrode made from the alloy would decrease.

Co atoms have the effect of decreasing the expansion coefficient after absorbing hydrogen as well as hydrogen equilibrium pressure of a hydrogen storage alloy. Therefore, it can prolong the cycle lifetime of the batteries comprising a negative electrode made from the alloy. In the hydrogen storage alloy of the present invention, the atom ratio of Co is in the range of about 0.1 to about 0.7. If it is less than 0.1, the effects of Co described above could not be shown. If it is higher than 0.7, the hydrogen equilibrium pressure would be much lower, which will result in the high cost of the batteries comprising a negative electrode made from the alloy.

Ni is one of the most important elements to keep high capacity of absorbing and desorbing hydrogen of a hydrogen storage alloy. It makes the alloy very easy to form a very stable crystal structure having $CaCu_5$-type hexagonal structure. It also has the effect of adjusting hydrogen equilibrium pressure of the hydrogen storage alloy. In the hydrogen storage alloy of the present invention, the atom ratio of Ni is in the range of about 3.5 to about 4.6. If the atom ratio of Ni is less than 3.5, the hydrogen absorption and desorption capacity of the alloy would decrease greatly, and the width of the pressure-platform would also decrease. If it is higher than 4.6, the hydrogen equilibrium pressure of the alloy would be too high to lower the efficiency of the charge and discharge of batteries comprising a negative electrode made from the alloy of the present invention.

It is well known that the radii of nitrogen and boron atoms are smaller. In the hydrogen storage alloy of the present invention, nitrogen atoms are added in the form of metal nitrides. Metals in the metal nitrides are those presented in the alloys of the present invention. For example, the metal nitrides used in the present invention include Mn nitride, Co nitride, Ni nitride etc. Boron atoms are added into the alloys of the present invention in the form of B—Fe alloys, which are commercially available. In the hydrogen storage alloy of the present invention, nitrogen and boron atoms occupy interstitial sites in the hexagonal phase of the alloy, and cause the lattice distorted, increase the lattice parameters and the strength of the alloy. In addition, boron atoms can enrich at the grain boundary and thus strengthen the grain boundary of the alloy. The increase of the strength of the alloy can greatly decrease the pulverization ratio of the alloy and decrease greatly the volume expansion ratio of the alloy powders. In addition, nitrogen and boron can form stable rare earth compounds with rare earth elements such as La, which can prevent rare earth elements from segregation toward the powder surface during the recharge and discharge process, decrease the corrosion probability of rare earth elements, improve the anti-corrosion properties of the alloy, and therefore prolong the cycle lifetime of the alloy. In the hydrogen storage alloy of the present invention, the preferred total amount of nitrogen and boron is in the range of about 0.005 to about 0.2. They can be added together or separately.

According to a preferred embodiment of the present invention, the hydrogen storage alloy has the following composition:

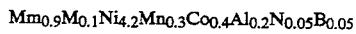
$Mm_{0.9}M_{0.1}Ni_{4.2}Mn_{0.3}Co_{0.4}Al_{0.2}N_{0.05}B_{0.05}$ wherein, Mm is a misch metal containing 43.1 percent by weight of La, 3.3 percent by weight of Ce, 13.5 percent by weight of Pr, 38.9 percent by weight of Nd and the balance amount of unavoidable impurities; M is titanium, zirconium or the mixture thereof.

It has been confirmed that the hydrogen storage alloy of the preferred embodiment of the present invention has the lowermost volume expansion ratio and the lowermost pulverization ratio. In addition, the electrical capacity of the alloy of the present invention, after 100 times hydrogen absorption and desorption cycles, maintain 98.6 percent of the original, which shows that this alloy has good anti-alkaline-corrosion properties as well as low pulverization ratio. Therefore, it is a hydrogen storage alloy having long cycle lifetime.

In the hydrogen storage alloy used as the material for preparing negative electrodes of rechargeable batteries of the present invention, nitrogen and boron are added. The addition of nitrogen and boron elements into a misch metal series hydrogen storage alloy, can greatly improve the anti-alkaline-corrosion properties and increase the strength of the alloy, and the alloy obtained thereby has lower pulverization ratio. Compared with a conventional hydrogen storage alloy, the volume expansion ratio of the alloy of the present invention is about 2.6 to about 3.6 percent lower than that of the conventional hydrogen storage alloy. The electrical capacity of the alloy of the present invention maintains at about 96.9 to about 98.6 percent of the original after 100 times hydrogen adsorption and desorption cycles. Therefore, according to the present invention, a hydrogen storage alloy used as a material for preparing negative electrode with long cycle lifetime and low cost can be obtained.

The present invention will be further described referring to the following examples and comparative examples.

In the following examples and comparative examples, the raw materials used for preparing hydrogen storage alloys were as follows: rare earth metals with a purity of higher than 98 percent, sponge Ti and Zr with a purity of 99 percent, Al with a purity of 99 percent, electrolytic Mn, Ni and Co with a purity of 99 percent. N and B were added in the form of nitrides and borides having medium melting point.

EXAMPLES 1–11

The raw materials of Mm, Ti, Zr, Ni, Mn, Co, and Al had the purity as mentioned above were weighed and mixed in predetermined ratios according to Table 1 in a vacuum inductive furnace and were melted therein. After that, melting process was carried out in argon atmosphere after the vacuity of said furnace reached $5 \times 10^{-4}$ Torr. Then the metal nitride and boron and iron alloy having the purity mentioned above were added and then the obtained liquid was cast in a water-cooled copper molder. After that, the ingot obtained thereby were crushed and then put into a stainless steel vessel to carry out activation treatment. When the vacuity of said stainless steel vessel was $1 \times 10^{-2}$ Torr, hydrogen was filled to carry out hydrogen-absorption activation treatment. Finally, the alloys were ground with a ball-mill to obtain fine powders having desirable size, i.e., having a particle size less than 350 mesh. Then, the electrical capacity of each of the alloys was measured by conventional electrochemical method, the lattice parameters of each of the alloys were measured by X-ray diffraction method before and after hydrogen-absorption, the volume expansion ratio of each of the alloys was calculated before and after hydrogen absorption. The results are listed in Table 2.

COMPARATIVE EXAMPLES 1–3

The same procedures of Example 1 were adopted except the amounts of various components were different from those used in the alloys of Example 1, and no metal nitride nor boride was added. The composition of the alloys prepared in the Comparative Examples 1–3 is also listed in Table 1. Then the electrical capacity, the lattice parameters, and the volume expansion ratio of each of the alloys were measured and calculated according to the methods described in Example 1. The results were also listed in Table 2.

TABLE 1

| Composition of Hydrogen Storage Alloys | | | | | | | | |
|---|---|---|---|---|---|---|---|---|
| Composition of Hydrogen Storage Alloys | | | | | | | | |
| Mm | Ti | Zr | Ni | Mn | Co | Al | N | B |
| Ex. | | | | | | | | |
| 1  0.99 | 0.01 | — | 3.5 | 0.6 | 0.7 | 0.3 | 0.02 | 0.03 |
| 2  0.9 | 0.1 | — | 3.8 | 0.2 | 0.6 | 0.2 | 0.08 | — |
| 3  0.9 | 0.1 | — | 4.2 | 0.3 | 0.3 | 0.3 | — | 0.05 |
| 4  0.8 | 0.2 | — | 4.0 | 0.3 | 0.3 | 0.5 | 0.04 | 0.10 |
| 5  0.9 | 0.1 | — | 4.2 | 0.3 | 0.4 | 0.2 | 0.05 | 0.05 |
| 6  0.9 | — | 0.1 | 4.2 | 0.3 | 0.3 | 0.3 | 0.05 | 0.05 |
| 7  0.9 | — | 0.1 | 4.0 | 0.4 | 0.4 | 0.3 | 0.06 | — |
| 8  0.99 | — | 0.01 | 4.2 | 0.3 | 0.5 | 0.1 | — | 0.05 |
| 9  0.9 | — | 0.1 | 4.6 | 0.4 | 0.1 | 0.2 | 0.03 | 0.07 |
| 10  0.8 | — | 0.2 | 3.8 | 0.2 | 0.6 | 0.2 | 0.05 | 0.15 |
| 11  0.8 | 0.1 | 0.1 | 4.2 | 0.3 | 0.3 | 0.3 | 0.02 | 0.05 |
| Com. Ex. | | | | | | | | |
| 1  1.0 | — | — | 4.2 | 0.3 | 0.3 | 0.3 | — | — |
| 2  1.0 | — | — | 4.0 | 0.4 | 0.4 | 0.2 | — | — |
| 3  0.7 | 0.2 | 0.1 | 4.2 | 0.3 | 0.3 | 0.3 | 0.08 | 0.2 |

TABLE 2

|  | Initial capacitance after 5 cycles (mAh/g) | Specific capacitance after 100 cycles (MAh/g) | The ratio between capacitance after 100 cycles and the initial capacitance (%) | Volume expansion ratio before and after hydrogen-absorption (%) |
| --- | --- | --- | --- | --- |
| Examples | | | | |
| 1 | 285 | 277 | 97.2 | 18.8 |
| 2 | 280 | 274 | 97.9 | 18.4 |
| 3 | 280 | 172 | 97.1 | 19.0 |
| 4 | 275 | 271 | 98.5 | 18.2 |
| 5 | 287 | 283 | 98.6 | 18.0 |
| 6 | 289 | 285 | 98.6 | 18.1 |
| 7 | 289 | 284 | 98.3 | 18.6 |
| 8 | 282 | 274 | 97.1 | 19.0 |
| 9 | 288 | 282 | 98.0 | 18.3 |
| 10 | 270 | 266 | 98.5 | 18.2 |
| 11 | 288 | 279 | 96.9 | 18.5 |
| Comparative Examples | | | | |
| 1 | 275 | 250 | 90.9 | 21.6 |
| 2 | 270 | 246 | 91.1 | 20.7 |
| 3 | 183 | — | — | 14.5 |

It can be seen from Table 2 that, due to the addition of nitrogen and/or boron to the alloys of Examples 1–11 of the present invention, the volume expansion ratios of the alloys of the present invention decrease by about 2.6 to about 3.6 percent compared with that of the alloy of Comparative Example 1. The volume expansion ratio of the alloy of Example 5 was 3.6 percent lower than that of the alloy of Comparative Example 1, which had the highest volume expansion ratio among the comparative alloys. As indicated above, the pulverization ratios of the alloy prepared according to the present invention decreases greatly during the hydrogen absorption and desorption process. The decrease of the pulverization ratio of an alloy is helpful to extend the cycle lifetime of the batteries comprising a negative electrode made from a misch metal series hydrogen storage alloy. It can also be seen that the specific electrical capacity of the alloy of the present invention maintains 96.9 percent to 98.6 percent of the original after 100 times hydrogen absorption and desorption cycles, which indicates that the cycle lifetime of the alloys of the present invention is longer, and the batteries comprising a negative electrode made from the alloys of the present invention have longer cycle lifetime. In Comparative Example 3, the nitrogen and boron contents goes beyond the scope of the present invention, its hydrogen absorption and desorption capacity decreases greatly (specific capacity decreases greatly) although its volume expansion ratio decreases greatly. Therefore, the alloy of Comparative Example 3 can not be used to prepare negative electrodes of rechargeable batteries.

What is claimed is:

1. A hydrogen storage alloy having a formula of:

$$Mm_{1-a}M_aNi_bMn_cCo_dAl_eX_f$$

wherein,

Mm is a misch metal mainly containing La, Ce, Pr, Nd and the balance amount of unavoidable impurities;

M is titanium, zirconium or a mixture thereof;

X is nitrogen or a mixture of nitrogen and boron; and $0.01 < a < 0.2$;
$3.5 < b < 4.6$;
$0.2 < c < 0.6$;
$0.1 < d < 0.7$;
$0.1 < e < 0.5$;
$0.005 < f < 0.2$; and
$4.8 < a + b + c + d + e + f < 5.4$.

2. A hydrogen storage alloy according to claim 1, wherein Mm is a misch metal containing about 40 to about 50 percent by weight of La, about 2.0 to about 4.0 percent by weight of Ce, about 10 to about 15 percent by weight of Pr, about 35 to about 40 percent by weight of Nd and the balance amount of unavoidable impurities.

3. A rechargeable battery, comprising a negative electrode made from the hydrogen storage alloys of claim 1.

4. A hydrogen storage alloy according to claim 2, wherein said Mm is a misch metal containing 43.1 percent by weight of La, 3.3 percent by weight of Ce, 13.5 percent by weight of Pr, 38.9 percent by weight of Nd and the balance amount of unavoidable impurities.

5. A hydrogen storage alloy having a formula of:

$$Mm_{0.9}M_{0.1}Ni_{4.2}Mn_{0.3}Co_{0.4}Al_{0.2}N_{0.05}B_{0.05}$$

wherein,

Mm is a misch metal containing 43.1 percent by weight of La, 3.3 percent by weight of Ce, 13.5 percent by weight of Pr, 38.9 percent by weight of Nd and the balance amount of unavoidable impurity;

M is titanium, zirconium or the mixture thereof.

6. A rechargeable battery, comprising a negative electrode made from the hydrogen storage alloys of claim 5.

* * * * *